UNITED STATES PATENT OFFICE.

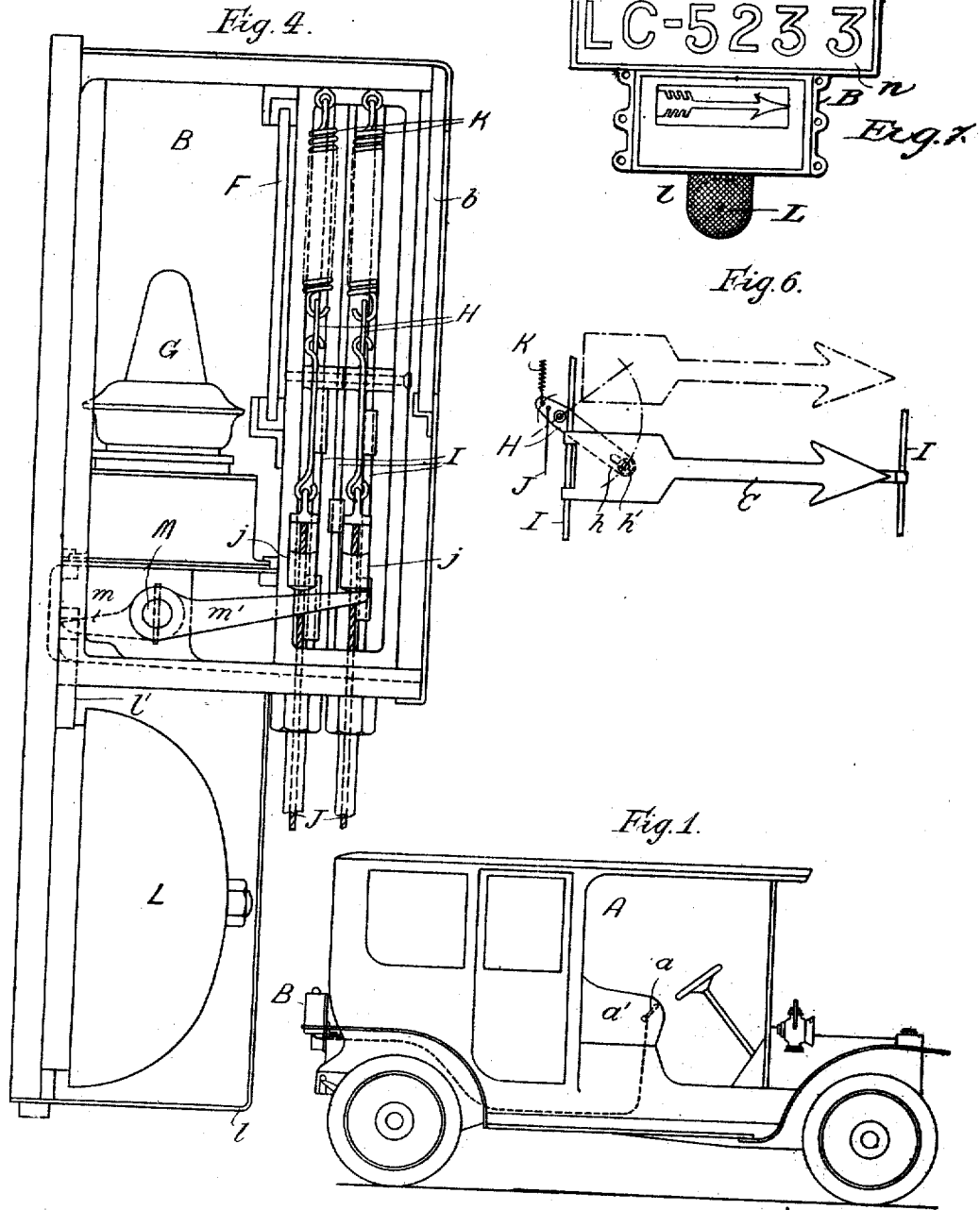

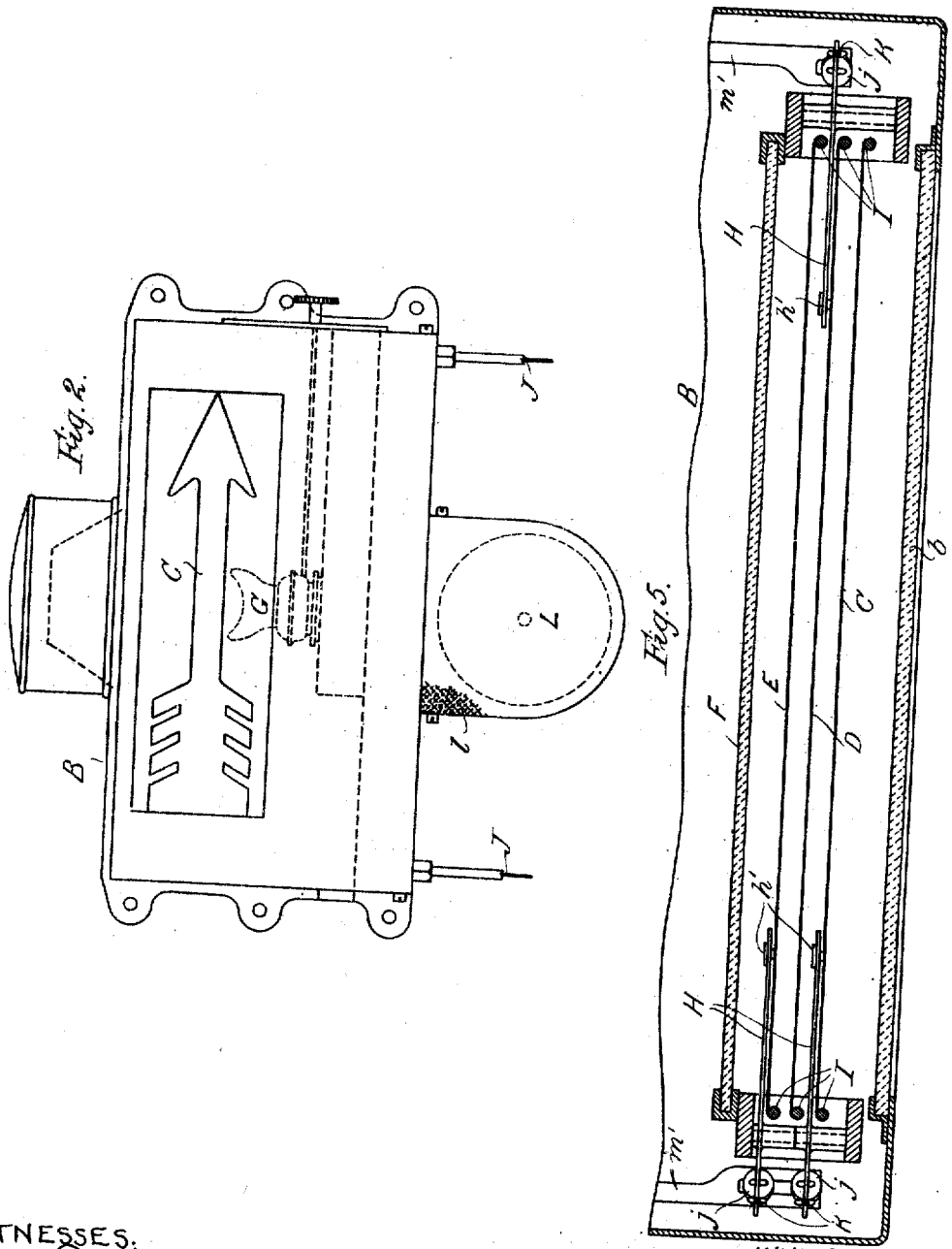

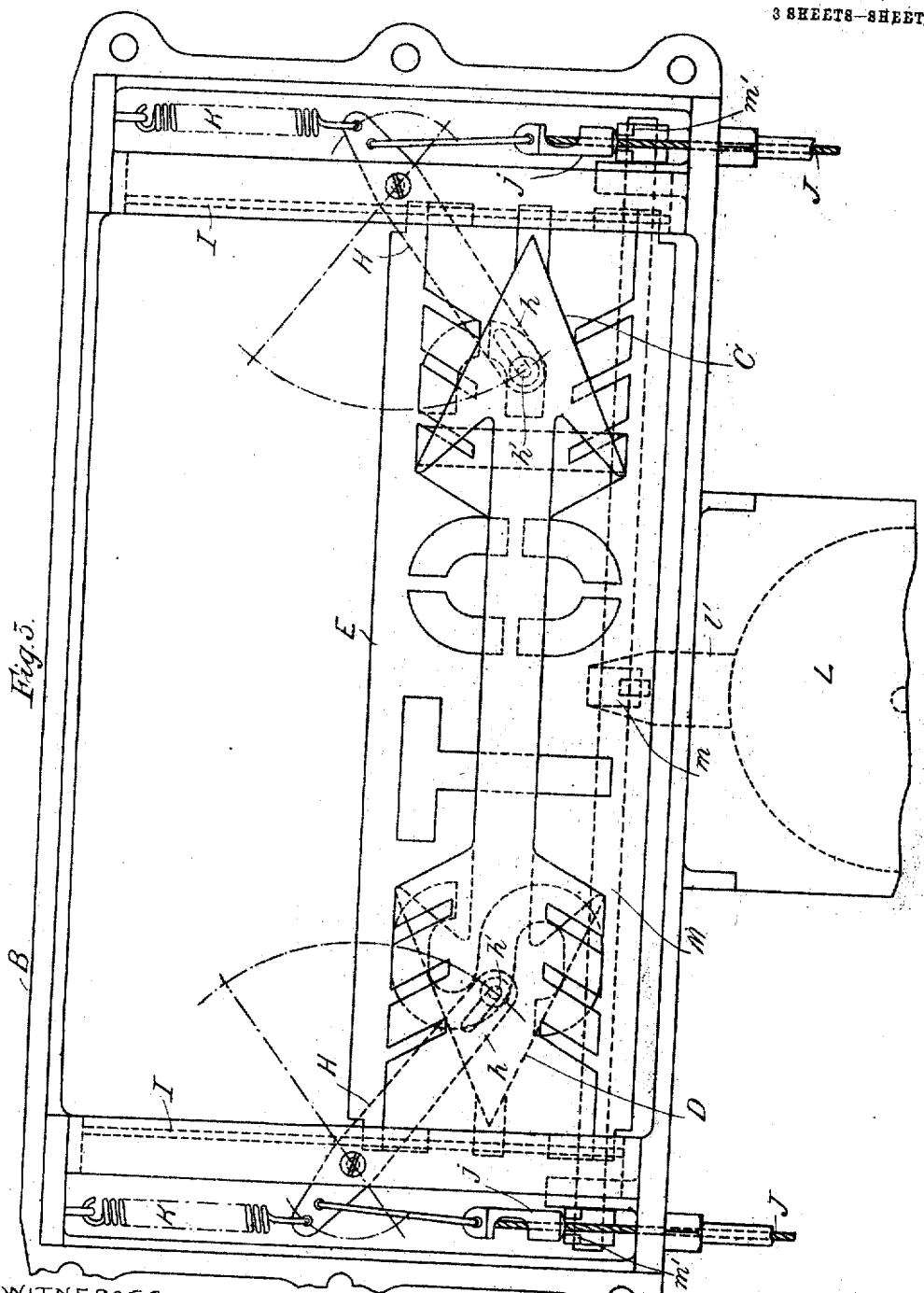

CHRISTOPHER O'NEILL CROWLEY AND HENRY ALFRED LAMB, OF LONDON, ENGLAND.

DIRECTION-INDICATOR FOR VEHICLES.

1,016,404.  Specification of Letters Patent.  Patented Feb. 6, 1912.

Application filed March 1, 1910. Serial No. 546,720.

*To all whom it may concern:*

Be it known that we, CHRISTOPHER O'NEILL CROWLEY and HENRY ALFRED LAMB, subjects of the King of the United Kingdom of Great Britain and Ireland, both residing at London, England, have invented a certain new and useful Improvement in Direction-Indicators for Vehicles, of which the following is a specification.

This invention relates to improvements in apparatus applicable to vehicles, for instance, to a mechanically driven vehicle for indicating for instance to following vehicles a plurality of signs, i. e. the next variation in the movement of the vehicle, as regards direction and as regards stopping.

The indications to be given by such apparatus are whether the vehicle is next to be moved to the right or to the left or is to be stopped. It is assumed that when the vehicle is traveling at what may be supposed to be a normal rate no indication regarding such movement need be given.

The improved apparatus is illustrated in the accompanying drawings in which—

Figure 1 is a side elevation of a motor driven vehicle equipped with the improved apparatus. Fig. 2 is a front elevation of the casing containing the indicating devices and Fig. 3 is a like view to Fig. 2 but shows the front cover removed. Fig. 4 is an elevation of the casing at right angles to Fig. 2, with the end cover removed. Fig. 5 is a sectional plan of the indicating devices and relative connections. Fig. 6 shows a detail of one of the indicating devices and its operative connections. Fig. 7 shows a modification.

Referring to Figs. 1 to 6, at the rear or other part of the vehicle A is fitted a casing B, so that the ends of the casing shall not project laterally from the vehicle. The said casing B is partly cut away at the front, and within the casing are fitted movable devices which serve to afford the indications above referred to. These devices comprise plates C, D and E, the plates C and D being of arrow shape and pointing to the right and to the left respectively, while the plate E is cut to present the word "Stop." All of the said devices are wholly inclosed within the casing B, with no projecting parts and are all normally concealed from view.

As shown, the casing B is provided with a transparent pane $b$ visible at the rear of the vehicle A and with a suitable background in front of which the plates C, D and E move. For instance, the plates may be blackened and the back-ground formed by a white opal glass plate F behind which plate a light may be located to illuminate the plate at night. A removable lamp is shown at G.

As heretofore, connections are provided for controlling the indicating devices from any desired part of the vehicle, for instance from a position adjacent the driver's seat or the steering column: the movement imparted to the plates being in the present case a vertical reciprocating movement for which purpose we provide suitable guides within the casing. As shown, each of said plates is adapted to be reciprocated by means of the slotted end $h$ of a double-armed pivoted lever H engaging a pin $h^1$ on each plate, the ends of said plates being guided by stationary bars or rods I, the desired movement being imparted by means of flexible wires J, e. g., Bowden wires such as heretofore employed, said wires acting against springs K connected to the levers H and to the casing B.

We also provide a bell or the like operatively connected with the means for moving the indicating devices, to give a warning when any one of the indicating devices is being operated. As shown, the bell L is located within a perforated casing $l$, the hammer connection $l^1$ being operated by a lever arm $m$ on a rock shaft M to each end of which shaft is secured a lever $m^1$ adapted to be actuated through the intermediary of stops $j$ connected to the ends of the levers H and movable by the wires J.

The indicating devices above described may be used in conjunction with the devices for showing the registered number of the vehicle to which they are fitted, the lamp for illuminating the indicating devices serving also as the tail lamp for the vehicle.

As shown in Fig. 7, the device for showing the registered number of the vehicle may comprise a casing N having a white opal or like glass plate $n$ on which the number is indicated, preferably in black, said casing being mounted on the casing B which may be provided with a ruby or other glass plate disposed behind the indicating plates, a lamp located behind said glass plates being adapted to illuminate them when desired.

It will be observed that the said indicating devices are separately movable into one and the same position so that the driver of a following vehicle for instance need only direct his eye to one point in the vehicle in front.

Having now described our invention what we claim and desire to secure by Letters Patent of the United States is:—

Apparatus for indicating variations in the movement of a vehicle, comprising, in combination, a casing having an aperture, vertical guides fitted within the casing, a plurality of indicating devices wholly contained within the casing, pivoted levers for moving said indicating devices independently in said guides into the same indicating position opposite the aperture, springs connected to said pivoted levers and to the casing, flexible means connected to said pivoted levers, stops on said flexible means, a rock shaft, lever devices secured to said rock shaft and adapted to be operated by said stops, and bell operating mechanism in operative relation with said lever devices.

In testimony whereof we have signed our names to this specification in the presence of two subscribing witnesses.

CHRISTOPHER O'NEILL CROWLEY.
HENRY ALFRED LAMB.

Witnesses:
WALLACE FAIRWEATHER,
JOHN McCLEARY, Jr.